United States Patent
Florea et al.

(10) Patent No.: US 9,942,146 B2
(45) Date of Patent: Apr. 10, 2018

(54) ROUTER PATH SELECTION AND CREATION IN A SINGLE CLOCK CYCLE

(71) Applicant: KnuEdge Incorporated, San Diego, CA (US)

(72) Inventors: Michael Florea, Lake Forest, CA (US); Jerome V. Coffin, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 73 days.

(21) Appl. No.: 15/226,833

(22) Filed: Aug. 2, 2016

(65) Prior Publication Data

US 2018/0041434 A1 Feb. 8, 2018

Related U.S. Application Data

(60) Provisional application No. 62/275,149, filed on Jan. 5, 2016.

(51) Int. Cl.
| | |
|---|---|
| *H04L 12/28* | (2006.01) |
| *H04L 12/741* | (2013.01) |
| *H04L 12/935* | (2013.01) |
| *H04L 12/879* | (2013.01) |
| *H04L 12/933* | (2013.01) |

(52) U.S. Cl.
CPC .......... *H04L 45/745* (2013.01); *H04L 49/109* (2013.01); *H04L 49/3027* (2013.01); *H04L 49/901* (2013.01)

(58) Field of Classification Search
None
See application file for complete search history.

(56) References Cited

U.S. PATENT DOCUMENTS

| | | | | |
|---|---|---|---|---|
| 7,006,536 | B1 * | 2/2006 | Somashekhar | H04J 3/1605 370/535 |
| 7,221,678 | B1 * | 5/2007 | Hughes | H04L 47/6285 370/401 |
| 7,729,239 | B1 * | 6/2010 | Aronov | H04L 1/1874 370/229 |
| 2004/0196859 | A1 * | 10/2004 | Benner | H04L 49/203 370/413 |
| 2006/0165070 | A1 * | 7/2006 | Hall | H04L 49/101 370/369 |
| 2007/0195761 | A1 * | 8/2007 | Tatar | H04L 49/1546 370/389 |

(Continued)

*Primary Examiner* — Otis L Thompson, Jr.
(74) *Attorney, Agent, or Firm* — Fish & Richardson P.C.

(57) ABSTRACT

Systems, devices, and techniques for routing packets are described. A described router includes ingress ports to receive packets; egress ports; ingress switch fabric coupled with the ingress ports; egress switch fabric coupled with the egress ports; floating buffers coupled between the ingress switch fabric and the egress switch fabric; and a controller. The controller can be configured to receive a packet via an ingress port, determine an egress port based on the packet's destination address, acquire a floating buffer, send to the egress port a buffer identifier corresponding to the acquired floating buffer, operate the ingress switch fabric to establish a first pathway between the acquired floating buffer and the ingress port to write the packet to the buffer, and operate the egress switch fabric to establish a second pathway between the acquired floating buffer and the egress port to write from the buffer to the egress port.

20 Claims, 8 Drawing Sheets

(56) References Cited

U.S. PATENT DOCUMENTS

| | | | |
|---|---|---|---|
| 2011/0317691 A1* | 12/2011 | Kajihara | H04L 49/101 370/359 |
| 2013/0152099 A1* | 6/2013 | Bass | G06F 9/5027 718/103 |
| 2015/0049758 A1* | 2/2015 | Ancajas | H04L 49/109 370/359 |
| 2016/0330127 A1* | 11/2016 | Kim | H04L 47/21 |
| 2017/0118033 A1* | 4/2017 | Srinivasan | H04L 12/18 |

\* cited by examiner

ROUTER PATH SELECTION AND CREATION IN A SINGLE CLOCK CYCLE

CROSS-REFERENCE TO RELATED APPLICATIONS

This patent document claims benefit under 35 U.S.C. § 119(e)(1) of U.S. Provisional Application No. 62/275,149, filed on Jan. 5, 2016, the entire contents of which are incorporated by reference herein.

FIELD OF THE DISCLOSURE

The systems, methods, and apparatuses described herein relate to routing packets.

BACKGROUND

Computer systems are often interconnected via one or more networks. Such networks can include a router configured to transfer a packet from an ingress port of the router to an egress port of the router. The router can be configured to extract a packet's destination address and forward the packet to an egress port that is associated with the destination address. The router can include multiple ingress ports and egress ports. A router can include a structure such as a crossbar switch or a bus to forward packets between ports.

In general, computer systems and routers are discrete, physically separate components. However, computer systems and one or more routers can be combined on a single integrated circuit (IC), or for brevity, chip. For example, such a chip can be referred to as a network on a chip (NoC). A NoC can include multiple processing cores that communicate using one or more on-chip routers. The on-chip routers can route packets to and from processing cores on the same chip or other chips.

SUMMARY

Systems and techniques for routing packets are disclosed. In one aspect of the disclosed technologies, a technique includes receiving a packet via an ingress port of a plurality of ingress ports; determining an egress port of a plurality of egress ports based on a destination address of the packet; acquiring a floating buffer from a plurality of floating buffers, the floating buffers being coupled between a plurality of ingress multiplexers and a plurality of egress multiplexers, the ingress multiplexers being coupled with the ingress ports, and the egress multiplexers being coupled with the egress ports; and sending to the egress port, a buffer identifier corresponding to the acquired floating buffer. The technique further includes identifying an ingress multiplexer of the ingress multiplexers based on the buffer identifier; and writing the packet from the ingress port to the acquired floating buffer via the identified ingress multiplexer. The technique further includes identifying an egress multiplexer of the egress multiplexers based on the egress port; and writing the packet from the acquired floating buffer to the egress port via the identified egress multiplexer.

These and other implementations can include one or more of the following features. Implementations can include selecting an input port of the identified ingress multiplexer that corresponds to the ingress port, and writing the packet from the ingress port to the acquired floating buffer via the selected input port of the identified ingress multiplexer. Implementations can include selecting an input port of the identified egress multiplexer based on the buffer identifier corresponding to the acquired floating buffer, and writing the packet from the acquired floating buffer to the egress port via the selected input port of the identified egress multiplexer. Implementations can include sending a notification concerning the packet to the egress port, the notification comprising a buffer identifier corresponding to the acquired floating buffer. Implementations can include inserting the buffer identifier into a queue of the egress port; and causing the egress port to send a ready notification based on a determination that the egress port is ready to handle the packet, the ready notification comprising the buffer identifier. Identifying the egress multiplexer can be triggered by a receipt of the ready notification. Acquiring the floating buffer from the plurality of floating buffers can include retrieving the buffer identifier from an available floating buffer queue. Implementations can include releasing the acquired floating buffer based on a completion of writing the packet from the acquired floating buffer to the egress port via the identified egress multiplexer, wherein releasing the acquired floating buffer can include inserting the buffer identifier into the available floating buffer queue. Writing the packet from the ingress port to the acquired floating buffer can include writing a first portion of the packet to the acquired floating buffer. Writing the packet from the acquired floating buffer to the egress port can include reading a second portion of the packet concurrently with writing the first portion of the packet.

In some implementations, the plurality of ingress ports can include first ingress ports and second ingress ports; the plurality of egress ports can include first egress ports and second egress ports; the plurality of ingress multiplexers can include first ingress multiplexers and second ingress multiplexers; and the plurality of egress multiplexers can include first egress multiplexers and second egress multiplexers. The first ingress ports, the first egress ports, the first ingress multiplexers, and the first egress multiplexers can be associated with an internal network. The second ingress ports, the second egress ports, the second ingress multiplexers, and the second egress multiplexers can be associated with an external network. Implementations can include routing a packet between the external network and the internal network.

In another aspect of the disclosed technologies, an apparatus includes ingress ports to receive packets; egress ports to transmit the packets; ingress multiplexers coupled with the ingress ports; egress multiplexers coupled with the egress ports; floating buffers coupled between the ingress multiplexers and the egress multiplexers; and a controller. The controller can be configured to perform operations including receiving a packet via an ingress port of the ingress ports, determining an egress port of the egress ports based on a destination address of the packet, acquiring a floating buffer of the floating buffers, sending to the egress port, a buffer identifier corresponding to the acquired floating buffer, identifying an ingress multiplexer of the ingress multiplexers based on the buffer identifier, selecting an input port of the identified ingress multiplexer that corresponds to the ingress port, writing the packet from the ingress port to the acquired floating buffer via the selected input port of the identified ingress multiplexer, identifying an egress multiplexer of the egress multiplexers based on the egress port, selecting an input port of the identified egress multiplexer based on the buffer identifier corresponding to the acquired floating buffer, and writing the packet from the acquired floating buffer to the egress port via the selected input port of the identified egress multiplexer.

In another aspect of the disclosed technologies, an apparatus includes ingress ports to receive packets; egress ports to transmit the packets; ingress multiplexers coupled with the ingress ports; egress multiplexers coupled with the egress ports; floating buffers coupled between the ingress multiplexers and the egress multiplexers; and a controller. The controller can be configured to perform operations including receiving a packet via an ingress port of the ingress ports, determining an egress port of the egress ports based on a destination address of the packet, acquiring a floating buffer of the floating buffers, sending to the egress port, a buffer identifier corresponding to the acquired floating buffer, identifying an ingress multiplexer of the ingress multiplexers based on the buffer identifier, selecting an input port of the identified ingress multiplexer that corresponds to the ingress port, writing the packet from the ingress port to the acquired floating buffer via the selected input port of the identified ingress multiplexer, identifying an egress multiplexer of the egress multiplexers based on the egress port, selecting an input port of the identified egress multiplexer based on the buffer identifier corresponding to the acquired floating buffer, and writing the packet from the acquired floating buffer to the egress port via the selected input port of the identified egress multiplexer. The apparatus can include an integrated circuit chip, where the integrated circuit chip includes the ingress ports, the ingress multiplexers, the egress multiplexers, the floating buffers, and the controller. The integrated circuit chip can include an internal network. The integrated circuit chip can communicate with an external network, the external network being external to the integrated circuit chip.

In yet another aspect of the disclosed technologies, an apparatus includes ingress ports to receive packets; egress ports to transmit the packets; ingress switch fabric coupled with the ingress ports; egress switch fabric coupled with the egress ports; floating buffers coupled between the ingress switch fabric and the egress switch fabric; and a controller. The controller can be configured to: receive a packet via an ingress port of the ingress ports, determine an egress port of the egress ports based on a destination address of the packet, acquire a floating buffer of the floating buffers to produce an acquired floating buffer, send to the egress port a buffer identifier corresponding to the acquired floating buffer, operate the ingress switch fabric to establish a first pathway between the acquired floating buffer and the ingress port, write the packet from the ingress port to the acquired floating buffer via the first pathway, operate the egress switch fabric to establish a second pathway between the acquired floating buffer and the egress port, and write the packet from the acquired floating buffer to the egress port via the second pathway.

These and other implementations can include one or more of the following features. In some implementations, the controller is configured to insert the buffer identifier into a queue of the egress port, and cause the egress port to send a ready notification based on a determination that the egress port is ready to handle the packet, the ready notification including the buffer identifier. In some implementations, the controller is configured to acquire the floating buffer by retrieving the buffer identifier from an available floating buffer queue. In some implementations, the controller is configured to release the acquired floating buffer by inserting the buffer identifier into the available floating buffer queue in response to completion of writing the packet from the acquired floating buffer to the egress port via the second pathway. In some implementations, the apparatus includes a dual-port memory structure to store the floating buffers, and the controller is configured to use the dual-port memory to overlap writing of at least a first portion of the packet to the acquired floating buffer and reading of at least a second portion of the packet from the acquired floating buffer.

Particular aspects of the disclosed technologies can be implemented so as to realize one or more of the following potential advantages. A described technology can create multiple routes from ingress ports to egress ports in a single clock cycle. A described technology can enable a router to perform up to N non-conflicting concurrent transfers per clock cycle, where N is the number of floating buffers within the router. A described technology can reduce the latency associated with transferring a packet from an ingress port to an egress port. A described technology can increase router throughput. A described technology can increase the reliability of end-to-end path transactions across two or more chips.

Details of one or more implementations of the disclosed technologies are set forth in the accompanying drawings and the description below. Other features, aspects, descriptions and potential advantages will become apparent from the description, the drawings, and the claims.

DETAILED DESCRIPTION

Figure 1:
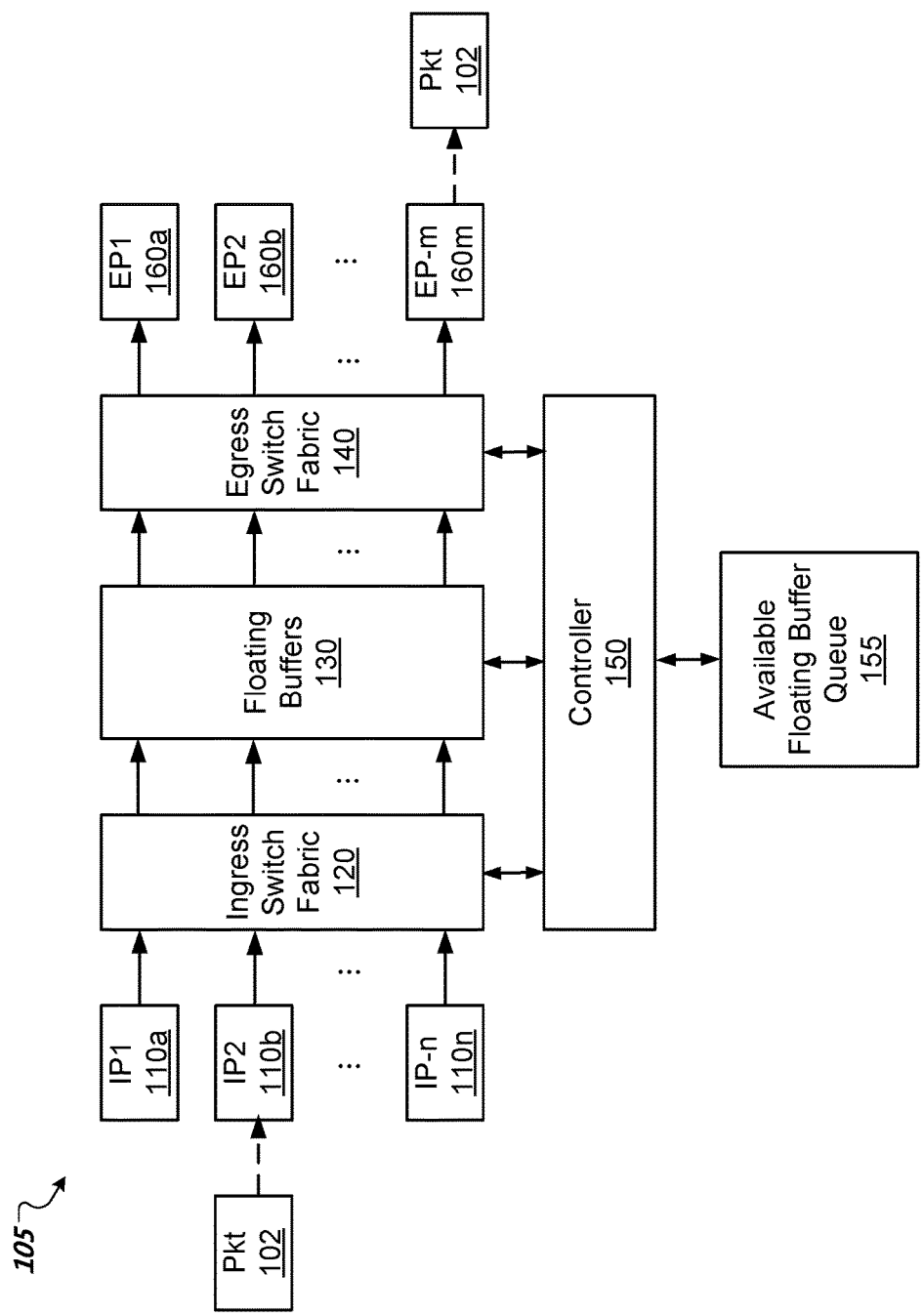
FIG. 1 shows an architecture of an example of a router that uses floating buffers, ingress switch fabric, and egress switch fabric to transfer packets between ingress ports and egress ports.

FIG. 1 shows an architecture of an example of a router 105 that uses floating buffers, ingress switch fabric, and egress switch fabric to transfer packets between ingress ports 110a-n and egress ports 160a-m. The router 105 can include ingress ports 110a-n (labelled IP1, IP2, IP-n), ingress switch fabric 120, floating buffers 130, egress switch fabric 140, controller 150, and egress ports 160a-m (labelled EP1, EP2, and EP-m). The floating buffers 130 can be coupled between the ingress switch fabric 120 and the egress switch fabric 140. The floating buffers 130 are considered to be "floating" since they are not dedicated to any specific ingress port 110a-n or specific egress port 160a-m, rather the floating buffers 130 can be dynamically allocated and released during operation of the router 105 as described herein.

The router 105 can create paths and select routes between the ingress ports 110a-n and the egress ports 160a-m. In some implementations, the router 105 can create two or more pathways between ingress ports 110a-n and the egress ports 160a-m in a single clock cycle to transfer two or more packets. In some implementations, a packet transfer can require two or more clock cycles to complete, but the router 105 can have multiple concurrent packet transfers at any given clock cycle. The router 105 can include a multi-port memory structure such as a dual-port memory structure to store the floating buffers 130. Using two or more memory ports of the memory structure, the router 105 can copy packet data from an ingress port 110a-n to a floating buffer 130 and concurrently copy packet data from the floating buffer 130 to the egress port 160a-m. In some implementations, the router 105 can perform up to N non-conflicting transfers per clock cycle, where N is the number of floating buffers 130. Each of the floating buffers 130 can be configured to store an entire packet.

The controller 150 can be configured to operate the ingress switch fabric 120, floating buffers 130, and egress switch fabric 140 to forward packet traffic from the ingress ports 110a-n to the egress ports 160a-m. When a packet 102 arrives at an ingress port 110b, the ingress port 110b can notify the controller 150 about the new packet 102. The controller 150 can extract a destination address of the packet 102 and determine an egress port 160m based on the destination address. The controller 150 can acquire a floating buffer of the floating buffers 130. The controller 150 can obtain a floating buffer identifier from an available floating buffer queue 155 that holds available floating buffer identifiers. In some implementations, to minimize a packet's occupancy in a floating buffer, the controller 150 can check whether the egress port 160m has sufficient available storage space to handle a packet before acquiring a floating buffer.

The controller 150 can operate the ingress switch fabric 120 to establish an ingress pathway between the ingress port 110b and the acquired floating buffer of the floating buffers 130. The controller 150 can cause the ingress port 110b to write the packet 102 to the acquired floating buffer via the established ingress pathway. The controller 150 can operate the egress switch fabric 140 to establish an egress pathway between the acquired floating buffer of the floating buffers 130 and the egress port 160m. The controller 150 can write the packet 102 from the acquired floating buffer to the egress port 160m via the established egress pathway. In some implementations, the controller 150 can send the floating buffer identifier to the egress port 160m to trigger the egress port 160m to retrieve the buffer contents corresponding to the floating buffer identifier. After the write to the egress port 160m is complete, the controller 150 can insert the floating buffer identifier into the available floating buffer queue 155 such that the corresponding floating buffer can be used for another packet.

In some implementations, the ingress ports 110a-n can be respectively combined with the egress ports 160a-m. For example, a device can be coupled with an ingress port 110a for traffic flowing into the router 105 and coupled with an egress port 160a for traffic flowing out of the router 105. In some implementations, the ingress ports 110a-n and the egress ports 160a-m include one or more of the following: a processor for packet processing, memory, medium access control (MAC) layer logic, physical (PHY) layer logic, one or more connectors such as an Ethernet connector, fiber optic connector, etc. In some implementations, each pair of ingress ports 110a-n and egress ports 160a-m share a transceiver. In some implementations, the router 105 is formed on an integrated circuit chip. In some implementations, the ingress ports 110a-n include respective wireline connections that couples on-chip computing resources with an on-chip version of the router 105, e.g., the computing resources and the router 105 are integrated on the same integrated circuit. In some implementations, the ingress switch fabric 120 includes a crossbar switch. In some implementations, the ingress switch fabric 120 includes a network of multiplexers, demultiplexers, or both. In some implementations, the egress switch fabric 140 includes a crossbar switch. In some implementations, the egress switch fabric 140 includes a network of multiplexers, demultiplexers, or both.

In some implementations, the router 105 can provide a quick start to transmitting a packet 102 because the router 105 can store an entire packet 102 in the router 105 (if necessary) before forwarding the packet 102 to the egress port 160m. At the same time, if the egress port 160m is available sooner, the router 105 can begin transmitting packet data out of the egress port 160m while still receiving a remainder portion of the packet 102 at the ingress port 110b. The router 105 may add a minimal processing delay from ingress port to egress port, assuming the next "hop" on the route is available immediately.

Figure 2:
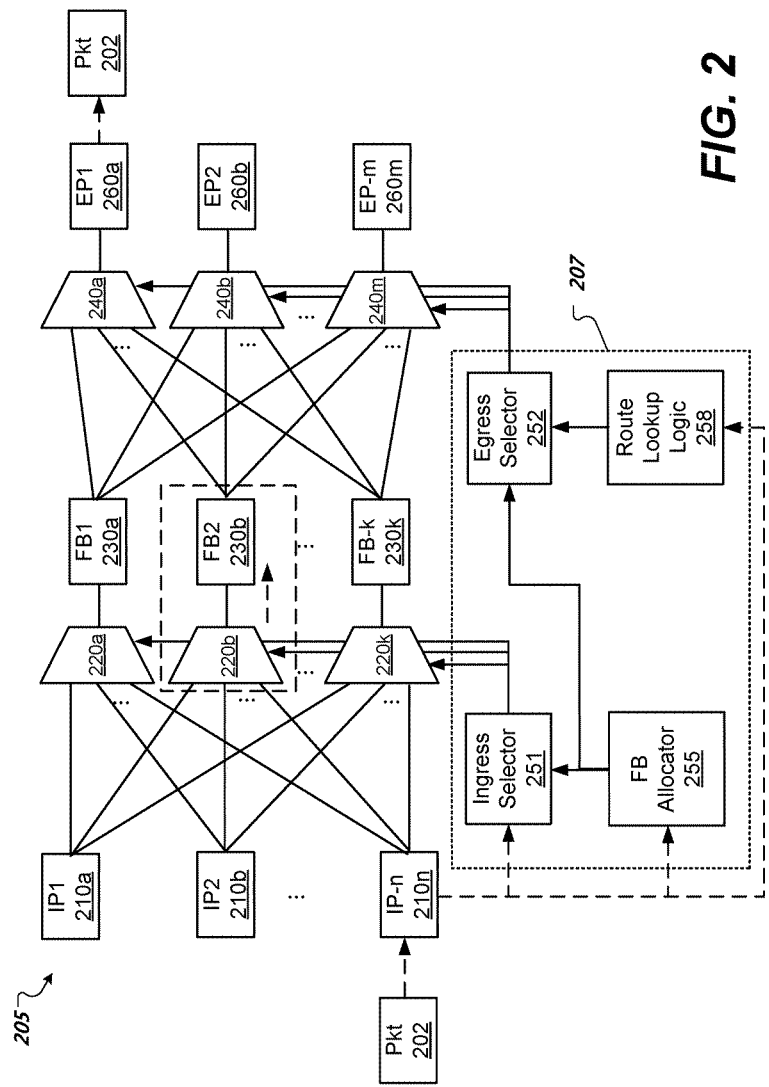
FIG. 2 shows an architecture of an example of a router that uses floating buffers, ingress multiplexers, and egress multiplexers to transfer packets between ingress ports and egress ports.

FIG. 2 shows an architecture of an example of a router 205 that uses floating buffers, ingress multiplexers, and egress multiplexers to transfer packets between ingress ports and egress ports. The router 205 can include ingress ports 210a-n (labelled IP1, IP2, IP-n), ingress multiplexers 220a-k, floating buffers 230a-k, egress multiplexers 240a-m, and egress ports 260a-m (labelled EP1, EP2, and EP-m). The router 205 can include an ingress selector 251, egress selector 252, floating buffer allocator 255, and route lookup logic 258. In some implementations, the router 205 includes a controller 207, and the controller 207 includes the ingress selector 251, the egress selector 252, the floating buffer allocator 255, and the route lookup logic 258.

When a packet 202 arrives at an ingress port 210n, the ingress port 210n can cause the floating buffer allocator 255 to allocate a floating buffer 230b from the group of floating buffers 230a-k. The router 205 can cause router circuitry such as the allocator 255 to send an identifier corresponding to the ingress port 210n holding the packet 202 and an identifier corresponding to the allocated floating buffer 230b to the ingress selector 251. Based on these identifiers, the ingress selector 251 can cause the appropriate ingress multiplexer 220b to establish a connection between the ingress port 210n and the allocated floating buffer 230b. After the connection is established, the ingress port 210n can transfer the packet 202 to the allocated floating buffer 230b.

The ingress port 210n can extract a destination address of the packet 202 and send the extracted destination address to the route lookup logic 258. The route lookup logic 258 can include a data structure such as a look-up table (LUT) or a database to translate the extracted destination address into an egress port identifier. Based on the floating buffer identifier and the egress port identifier, the egress selector 252 can cause the appropriate egress multiplexer 240a (i.e., the one corresponding to the egress port identifier) to establish a connection between the allocated floating buffer 230b and the egress port 260a. In some implementations, egress selector 252 establishes the connection based on a trigger event from the egress port 260a such as a ready notification. After the connection is established, the egress port 260a can read from the allocated floating buffer 230b via the appropriate egress multiplexer 240a. In some implementations, the route lookup logic 258 is configured to perform two or more route lookups per clock cycle to enable two or more concurrent packet transfers through the router 205.

Figure 3:
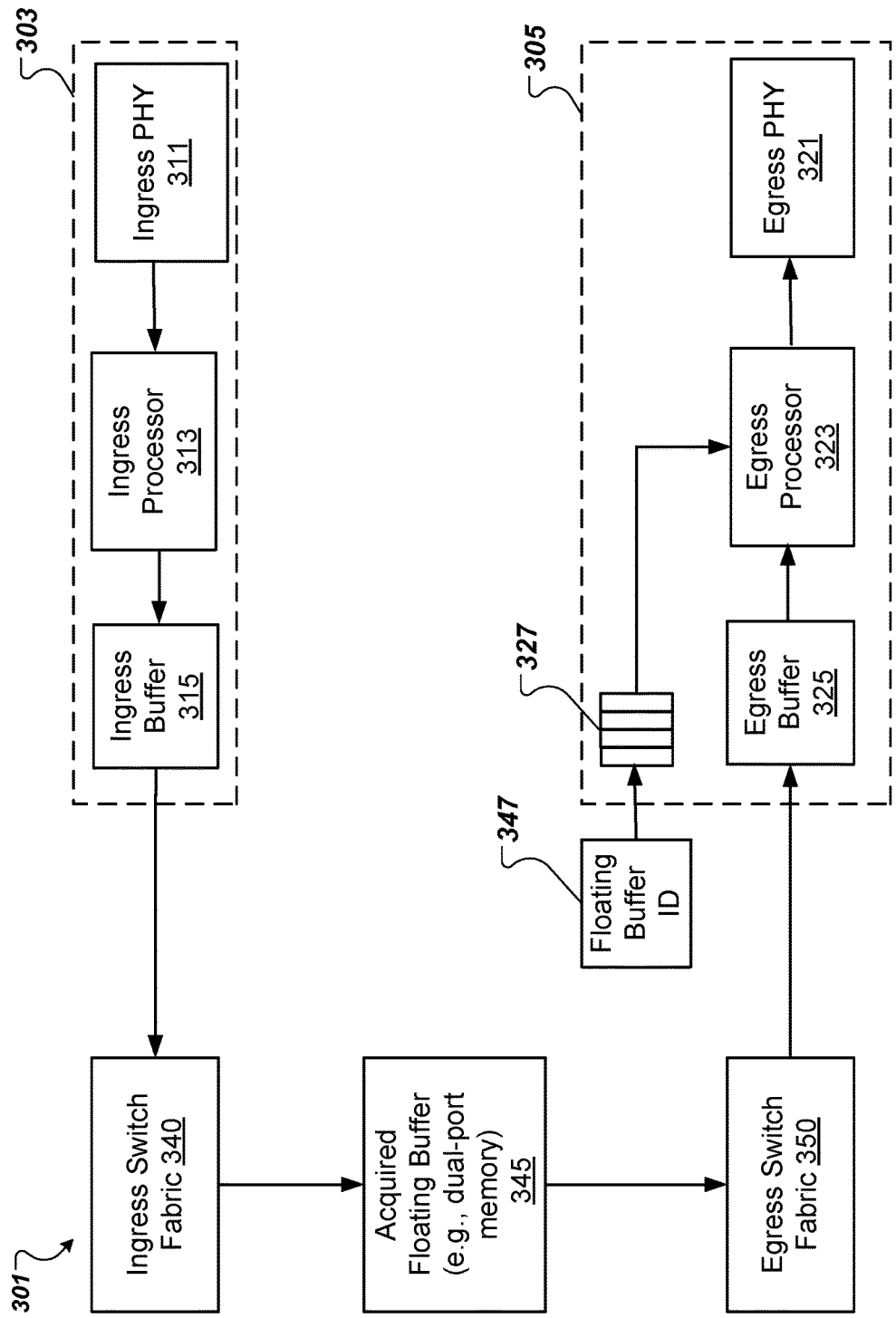
FIG. 3 shows a router architecture example including high-level details for an ingress port and an egress port of a router.

FIG. 3 shows a router architecture example including high-level details for an ingress port 303 and an egress port 305 of a router 301. An ingress port 303 of a router 301 can include an ingress physical (PHY) module 311, ingress processor 313, and ingress buffer 315. In some implementations, the ingress processor 313 can transfer a packet from the ingress PHY module 311 into the ingress buffer 315. In some implementations, the ingress processor 313 causes the PHY module 311 to write a packet to the ingress buffer 315. An egress port 305 of the router 301 can include an egress PHY module 321, egress processor 323, egress buffer 325, and in-take queue 327. In some implementations, a port 303, 305 can include transceiver circuitry that performs the functionality of an ingress PHY module 311, egress PHY module 321, or both.

After receiving a packet at the ingress port 303, the ingress processor 313 can cause the router 301 to acquire a floating buffer 345 and place a corresponding floating buffer identifier 347 into the in-take queue 327 of the egress port 305. Further, the ingress processor 313 can cause the router 301 to control ingress switch fabric 340 such that the router 301 transfers the received packet from the ingress buffer 315 into the acquired floating buffer 345.

The egress processor 323 can cause the router 301 to control egress switch fabric 350 such that the router 301 transfers the received packet from the acquired floating buffer 345 to the egress buffer 325. In more detail, the egress processor 323 can retrieve a floating buffer identifier from its in-take queue 327 and cause the router 301 to transfer contents of the corresponding floating buffer 435 into the egress buffer 325. The egress processor 323 can cause the PHY module 321 to transmit data based on the packet stored in the egress buffer 325. In some implementations, the acquired floating buffer 345 is one of many buffers within a dual-ported memory structure configured for overlapping write and read operations. In some implementations, the acquired floating buffer 345 is a dual-ported memory structure, and the router 301 includes separate structures for respective floating buffers. In some implementations, the dual-ported memory structure includes static random access memory (SRAM). In some implementations, the dual-ported memory structure includes synchronous dynamic random access memory (SDRAM). Other types of memory for floating buffers are possible.

Figure 4:
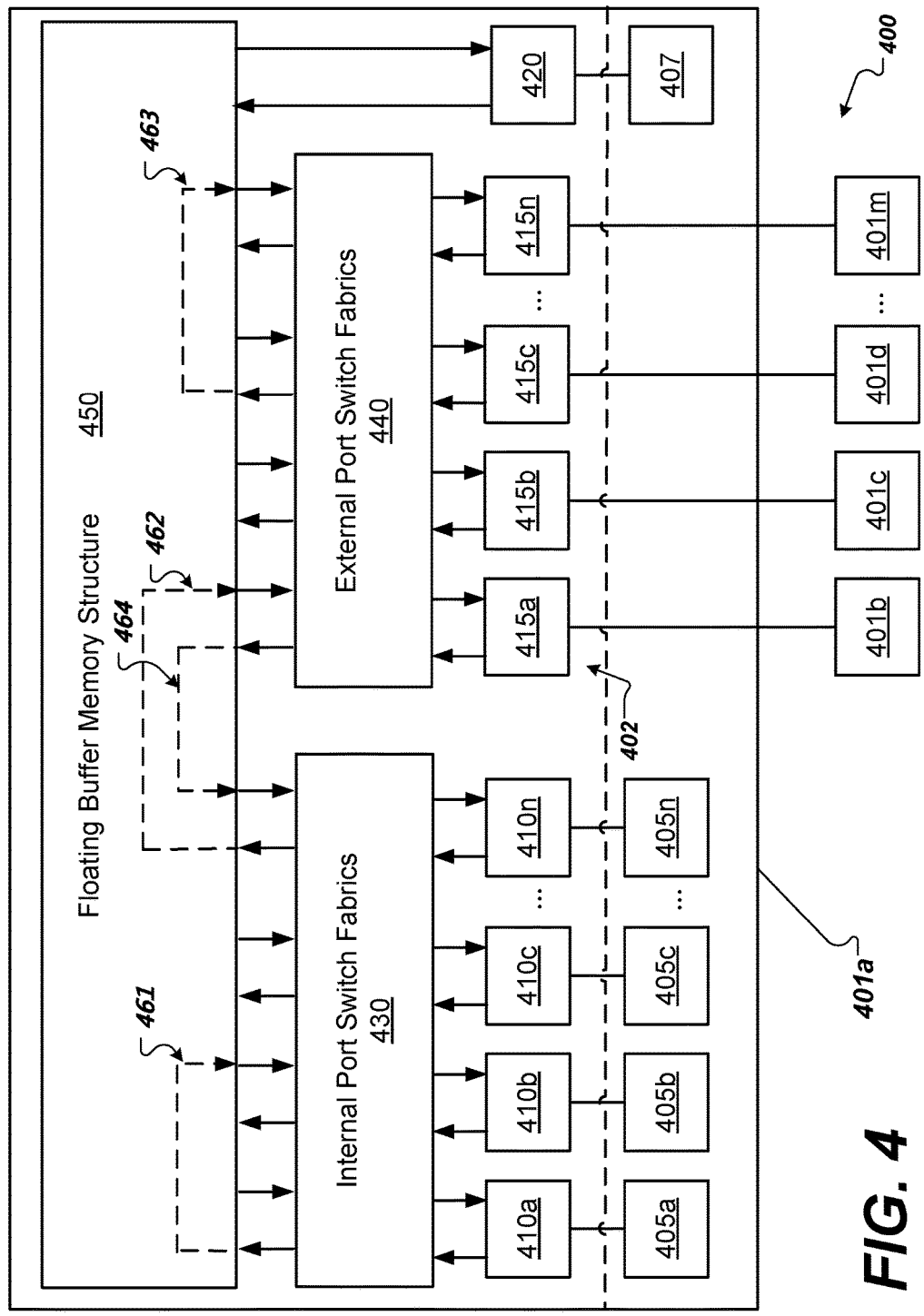
FIG. 4 shows an architecture of an example of a network on a chip router.

FIG. 4 shows an architecture of an example of a network on a chip router including details of a chip 401a of a system 400. The system 400 includes interconnected chips 401a-m. The chips 401a-m can be arranged in a topology such as a star, grid, line, or circle. Other types of topologies are possible. The chip 401a includes a router 402, computing resources 405a-n, and chip management device 407. The router 402 includes internal ports 410a-n, external ports 415a-n, management port 420, internal port switch fabrics 430, external port switch fabrics 440, a floating buffer memory structure 450. The internal port switch fabrics 430 can include an ingress port switch fabric (e.g., see fabric 120 of FIG. 1) and an egress port switch fabric (e.g., see fabric 140 of FIG. 1). The external port switch fabrics 440 can include an ingress port switch fabric (e.g., see fabric 120 of FIG. 1) and an egress port switch fabric (e.g., see fabric 140 of FIG. 1).

The chip's router 402 can be configured to route packets within the chip 401a and among the chips 401a-m. Associated with an internal network of the chip 401a, the internal ports 410a-n of the router 402 can forward packets to and from the computing resources 402a-n of the chip 410a. Associated with an external network, the external ports 415a-n of the router 402 can forward packets to and from the other chips 410b-m.

The router 402 can forward packets completely within the chip 401a (e.g., see arrow 461). Further, the router 402 can forward packets from an internal source, e.g., computing resource 405n, to an external destination, e.g., chip 401b (see, e.g., arrow 462). The router 402 can forward packets from an external source, e.g., chip 401b, to an internal destination, e.g., computing resource 405n (see, e.g., arrow 464). In some implementations, the router 402 can forward packets from one chip 401d to another chip 401m (e.g., see arrow 463).

The internal ports 410a-n are coupled with the computing resources 405a-n of the chip 401a. The external ports 415a-n are coupled with other chips 401b-m. The management port 420 is coupled with the chip management device 407. The internal ports 410a-n are coupled with the internal port switch fabrics 430. The external ports 415a-n are coupled with the external port switch fabrics 440. The internal port switch fabrics 430, the external port switch fabrics 440, and management port 420 are coupled with the floating buffer memory structure 450. In some implementations, the floating buffer memory structure 450 includes separate dual-ported memory areas for respective floating buffers.

Figure 5:
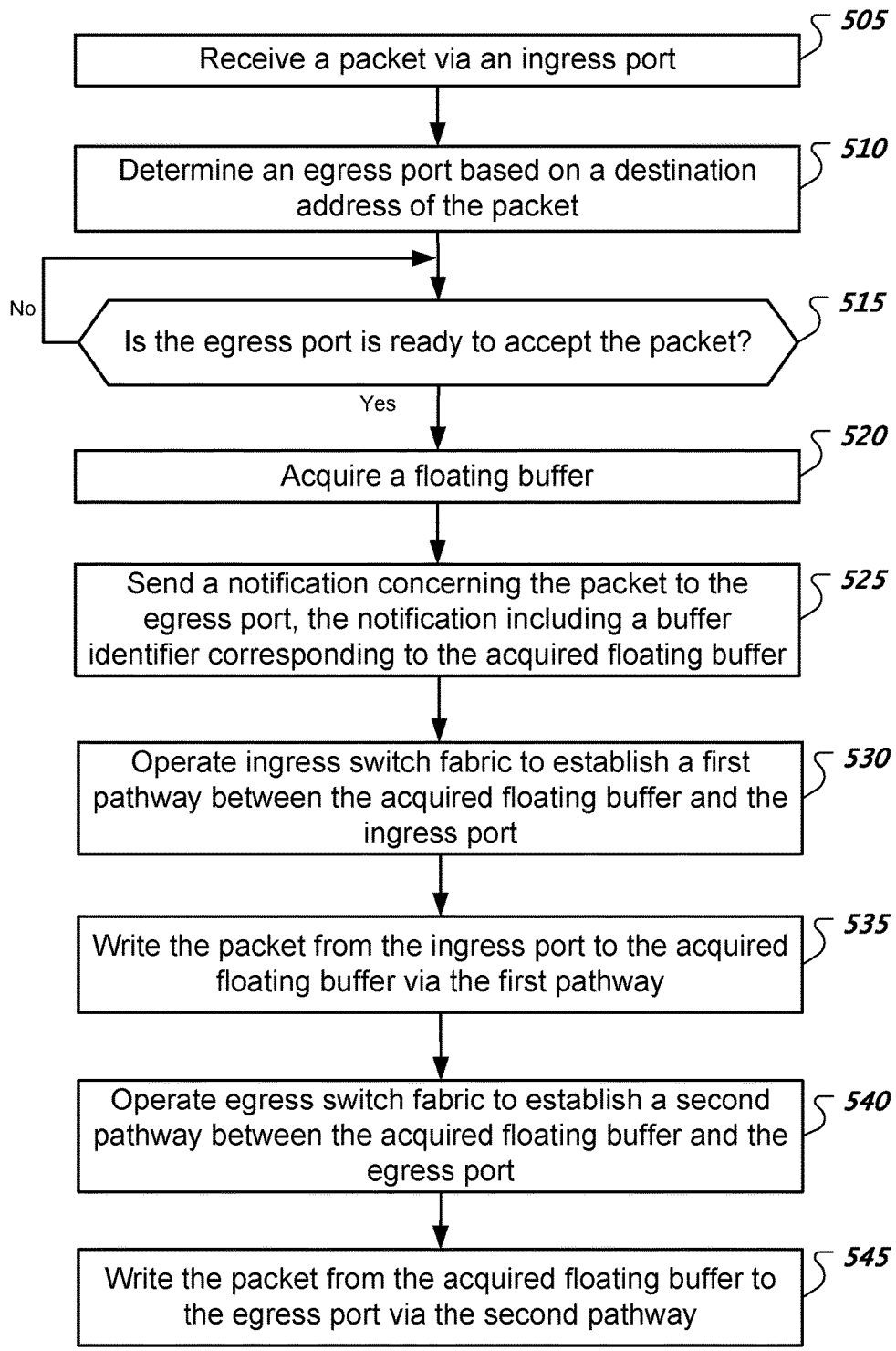
FIG. 5 shows a flowchart of an example of a routing process that controls packet flow through ingress ports, ingress switch fabric, floating buffers, egress switch fabric, and egress ports.

FIG. 5 shows a flowchart of an example of a routing process that controls packet flow through ingress ports, ingress switch fabric, floating buffers, egress switch fabric, and egress ports. A device such as a router can be configured to perform the routing process of FIG. 5. At 505, the process receives a packet via an ingress port. In some implementations, an ingress port includes transceiver circuitry to receive a packet, an ingress port buffer, and a processor configured to transfer the packet into the ingress port buffer. At 510, the process determines an egress port based on a destination address of the packet. Determining an egress port can include accessing a data structure, such as a LUT or a database, based on a packet's destination address and retrieving an egress port identifier from the data structure. In some implementations, the process can use a default egress port if there is not a hit for the destination address within the data structure. In some implementations, the process can drop the packet if there is not a hit for the destination address within the data structure.

At 515, the process determines whether the egress port is ready to accept the packet. In some implementations, determining whether the egress port is ready to accept the packet can include checking whether the egress port has available buffer space. In some implementations, if the egress port is not currently ready to accept, the process can wait for a predetermined amount of time and then perform the check again. After determining that the egress port is ready, the process acquires a floating buffer at 520. Acquiring a floating buffer can include accessing a queue that stores identifiers that correspond to available floating buffers and retrieving a floating buffer identifier. At 525, the process sends a notification concerning the packet to the egress port. The notification can include a buffer identifier corresponding to the acquired floating buffer. In some implementations, sending the notification can include writing the buffer identifier into an egress port in-take queue.

At 530, the process operates ingress switch fabric to establish a first pathway between the acquired floating buffer and the ingress port. Establishing the first pathway can include programming one or more switching elements to create a temporary connection between the ingress port and the acquired floating buffer. Various examples of switching elements include crossbar elements, multiplexers, and demultiplexers. Other types of switching elements are possible. In some implementations, establishing a pathway can include asserting one or more logic signals to cause a switching element to select an input port, output port, or both. At 535, the process writes the packet from the ingress port to the acquired floating buffer via the first pathway. In some implementations, writing the packet from the ingress port to the acquired floating buffer can include transferring the packet from an ingress port buffer to a memory region within a floating buffer memory structure.

At 540, the process operates egress switch fabric to establish a second pathway between the acquired floating buffer and the egress port. Establishing the second pathway can include setting one or more switching elements to create a temporary connection between the acquired floating buffer and the egress port. At 545, the process writes the packet from the acquired floating buffer to the egress port via the second pathway. In some implementations, establishing the second pathway at 540 and the writing at 545 are triggered by a start command issued by the egress port. In some implementations, writing the packet to the floating buffer at 535 overlaps with writing the packet from the acquired floating buffer to the egress port at 545. For example, while writing a portion of the packet to the floating buffer at 535, the process can read a different, previously written portion of the packet from the floating buffer to perform the writing at 545.

Figure 6A:
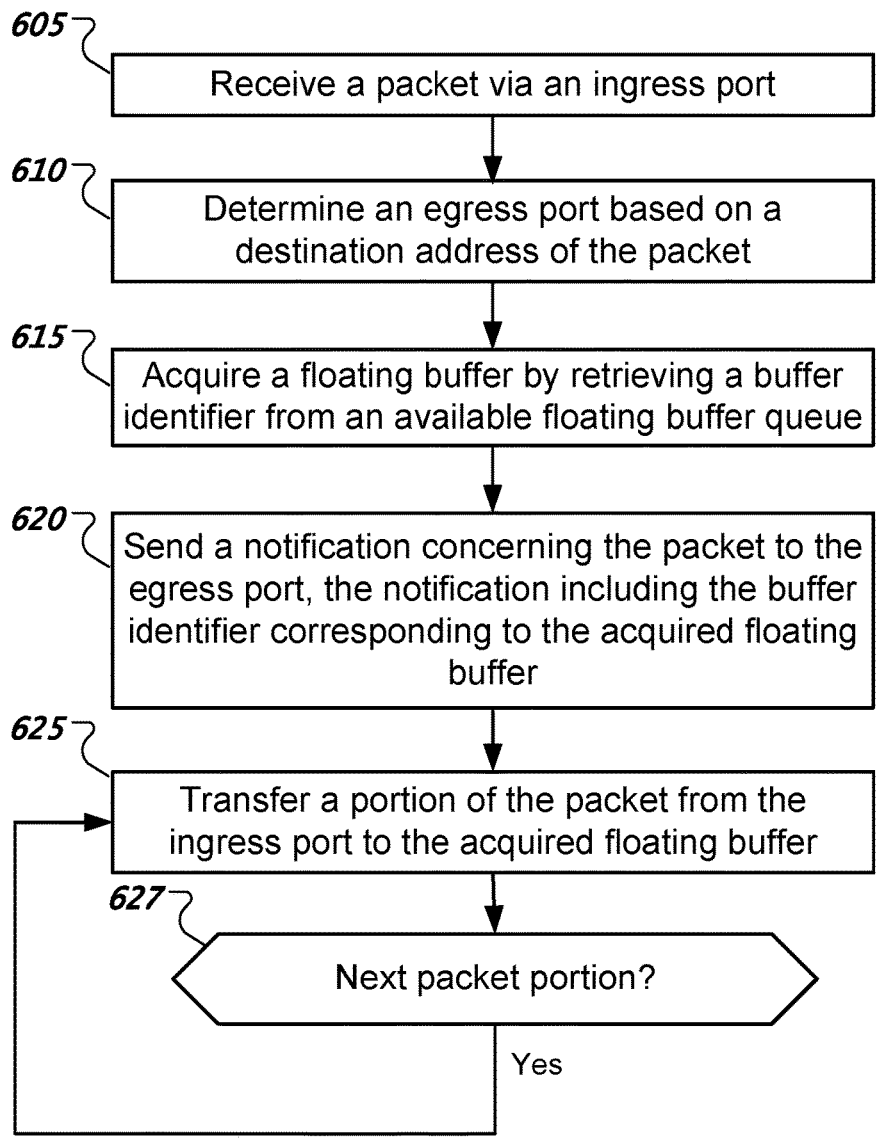
FIGS. 6A and 6B show a flowchart of an example of a routing process that transfers packets using floating buffers.
Figure 6B:
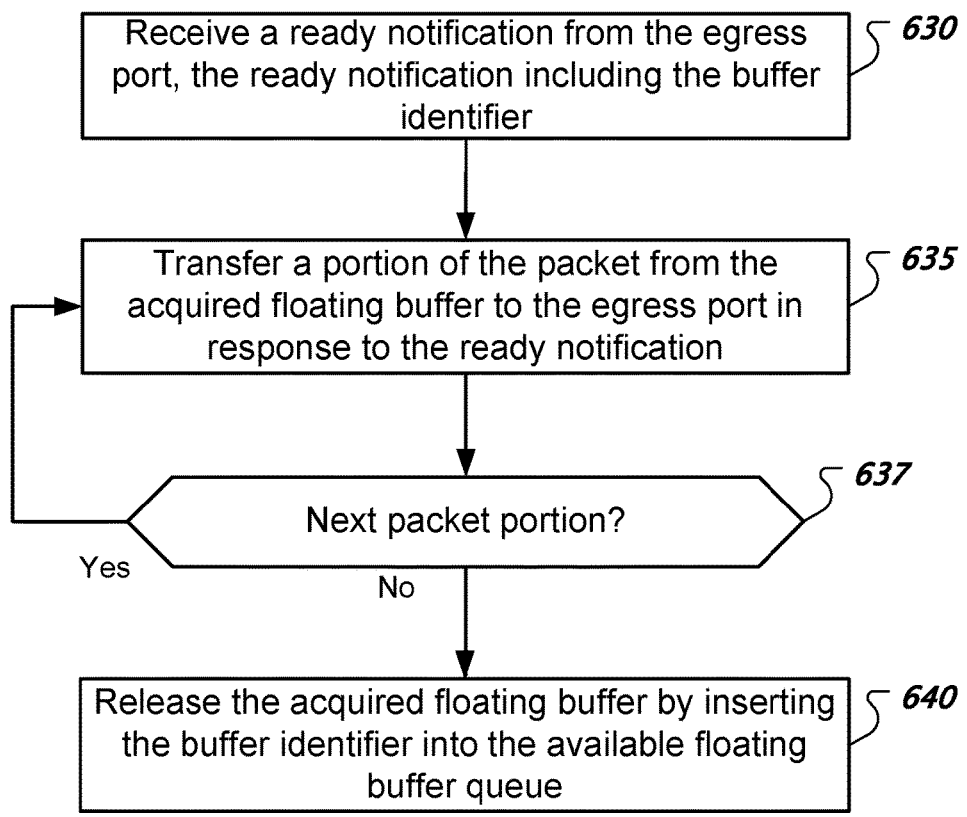

FIGS. 6A and 6B show a flowchart of an example of a routing process that transfers packets using floating buffers. A device such as a router can be configured to perform the routing process of FIG. 6. At 605 in FIG. 6A, the process receives a packet via an ingress port. In some implementations, an ingress port includes transceiver circuitry to receive a packet, ingress port buffer, and a processor configured to transfer the packet into the ingress port buffer. At 610, the process determines an egress port based on a destination address of the packet. Determining an egress port can include sending an address resolution request containing the packet's destination address to routing logic and receiving an egress port identifier from the routing logic.

At 615, the process acquires a floating buffer by retrieving a buffer identifier from an available floating buffer queue. In some implementations, a buffer identifier includes a number that uniquely identifies a buffer within a group of buffers. In some implementations, a buffer identifier includes a memory offset, where the memory offset points to a particular location within a floating buffer memory structure. At 620, the process sends a notification concerning the packet to the egress port. The notification can include the buffer identifier corresponding to the acquired floating buffer. At 625, the process transfers a portion of the packet from the ingress port to the acquired floating buffer. In some implementations, the process transfers the packet at 625 in accordance with the example of FIG. 7A. In some implementations, the process transfers m bits of the packet per clock from the ingress port to the acquired floating buffer. At 627, the process determines whether there is a next portion of the packet to transfer. If there is a next portion, the process continues the transfer at 625.

In FIG. 6B, at 630, the process receives a ready notification from the egress port. In this example, the egress port transmits a ready notification in response to receiving the notification sent by the process at 620. The ready notification can include the buffer identifier. At 635, the process transfers a portion of the packet from the acquired floating buffer to the egress port in response to the ready notification. In some implementations, the process transfers the packet at 635 in accordance with the example of FIG. 7B. In some implementations, when the egress port is ready to have the packet transferred to the egress port, the egress port can send a ready notification to a router controller, and accordingly, the controller triggers the transfer at 635. In some implementations, floating buffer circuitry includes a dual-port memory interface to enable the process to overlap writing to the acquired floating buffer with reading from the acquired floating buffer. Note that one or more of the transfers at 625 in FIG. 6A can overlap with one or more of the transfers at 635 in FIG. 6B. In some implementations, the process transfers m bits of the packet per clock from the acquired floating buffer to the egress port. At 637, the process determines whether there is a next portion of the packet to transfer. If there is a next portion, the process continues the transfer at 635. Otherwise, the transfer to the egress port is complete, and then at 640, the process releases the acquired floating buffer by inserting the buffer identifier into the available floating buffer queue.

Figure 7A:
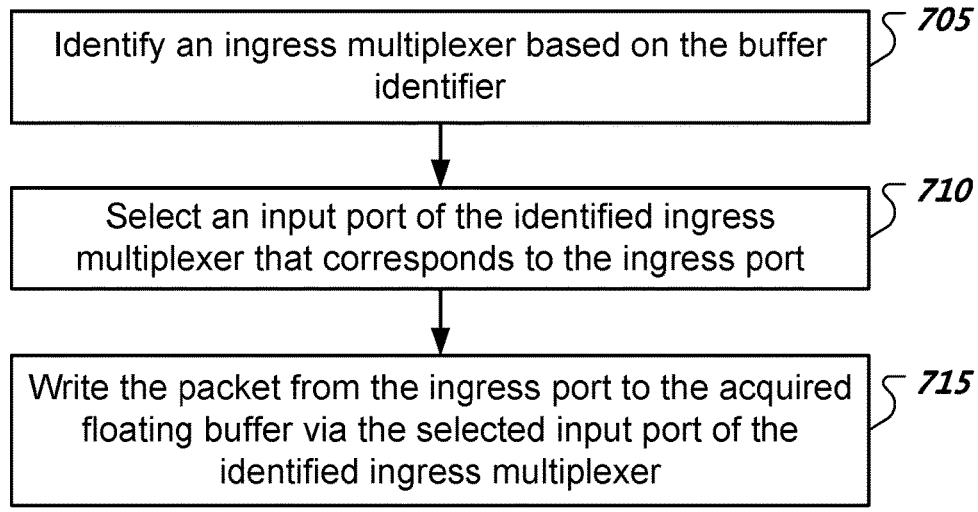
FIG. 7A shows a flowchart of an example of an ingress transfer process that transfers a packet from an ingress port to an acquired floating buffer.

FIG. 7A shows a flowchart of an example of an ingress transfer process that transfers a packet from an ingress port to an acquired floating buffer. At 705, the process identifies an ingress multiplexer based on the buffer identifier. At 710, the process selects an input port of the identified ingress multiplexer that corresponds to the ingress port. In some implementations, the floating buffers have corresponding ingress multiplexers, where each ingress multiplexer is coupled with the same group of ingress ports, e.g., ingress multiplexer input ports are respectively coupled with the ingress ports. In some implementations, the process sends a logic signal to the identified ingress multiplexer to cause the multiplexer to select the appropriate one of its input ports. At 715, the process writes the packet from the ingress port to the acquired floating buffer via the selected input port of the identified ingress multiplexer.

Figure 7B:
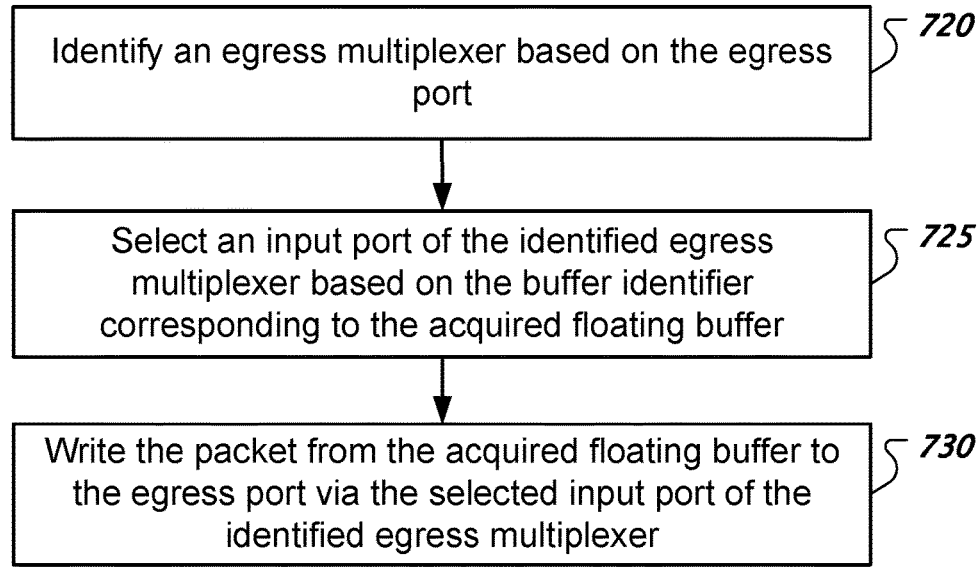
FIG. 7B shows a flowchart of an example of an egress transfer process that transfers a packet from an acquired floating buffer to an egress port.

FIG. 7B shows a flowchart of an example of an egress transfer process that transfers a packet from an acquired floating buffer to an egress port. At 720, the process identifies an egress multiplexer based on the egress port. At 725, the process selects an input port of the identified egress multiplexer based on the buffer identifier corresponding to the acquired floating buffer. In some implementations, the egress ports have corresponding egress multiplexers, where each egress multiplexer is coupled with the group of floating buffers, e.g., egress multiplexer input ports are respectively coupled with the floating buffers. At 730, the process writes the packet from the acquired floating buffer to the egress port via the selected input port of the identified egress multiplexer.

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A method comprising:
   receiving a packet via an ingress port of a plurality of ingress ports;
   determining an egress port of a plurality of egress ports based on a destination address of the packet;
   acquiring a floating buffer from a plurality of floating buffers, wherein the floating buffers are coupled between a plurality of ingress multiplexers and a plurality of egress multiplexers, wherein the ingress multiplexers are coupled with the ingress ports, and wherein the egress multiplexers are coupled with the egress ports;
   sending to the egress port, a buffer identifier corresponding to the acquired floating buffer;
   identifying an ingress multiplexer of the ingress multiplexers based on the buffer identifier;
   writing the packet from the ingress port to the acquired floating buffer via the identified ingress multiplexer;
   identifying an egress multiplexer of the egress multiplexers based on the egress port; and
   writing the packet from the acquired floating buffer to the egress port via the identified egress multiplexer.

2. The method of claim 1, comprising:
   inserting the buffer identifier into a queue of the egress port; and
   causing the egress port to send a ready notification based on a determination that the egress port is ready to handle the packet, wherein the ready notification comprises the buffer identifier, and
   wherein identifying the egress multiplexer is triggered by a receipt of the ready notification.

3. The method of claim 1, wherein acquiring the floating buffer from the plurality of floating buffers comprises retrieving the buffer identifier from an available floating buffer queue.

4. The method of claim 3, comprising:
   releasing the acquired floating buffer based on a completion of writing the packet from the acquired floating buffer to the egress port via the identified egress multiplexer, wherein releasing the acquired floating buffer comprises inserting the buffer identifier into the available floating buffer queue.

5. The method of claim 1, wherein writing the packet from the ingress port to the acquired floating buffer comprises writing a first portion of the packet to the acquired floating buffer, and wherein writing the packet from the acquired floating buffer to the egress port comprises reading a second portion of the packet concurrently with writing the first portion of the packet.

6. The method of claim 1, wherein the plurality of ingress ports comprises first ingress ports and second ingress ports,
   wherein the plurality of egress ports comprises first egress ports and second egress ports,
   wherein the plurality of ingress multiplexers comprises first ingress multiplexers and second ingress multiplexers,
   wherein the plurality of egress multiplexers comprises first egress multiplexers and second egress multiplexers,
   wherein the first ingress ports, the first egress ports, the first ingress multiplexers, and the first egress multiplexers are associated with an internal network, and
   wherein the second ingress ports, the second egress ports, the second ingress multiplexers, and the second egress multiplexers are associated with an external network.

7. The method of claim 6, comprising:
   routing a packet between the external network and the internal network.

8. An apparatus comprising:
   ingress ports to receive packets;
   egress ports to transmit the packets;
   ingress multiplexers coupled with the ingress ports;
   egress multiplexers coupled with the egress ports;

floating buffers coupled between the ingress multiplexers and the egress multiplexers; and a controller configured to perform operations comprising:
receiving a packet via an ingress port of the ingress ports,
determining an egress port of the egress ports based on a destination address of the packet,
acquiring a floating buffer of the floating buffers,
sending to the egress port, a buffer identifier corresponding to the acquired floating buffer,
identifying an ingress multiplexer of the ingress multiplexers based on the buffer identifier,
writing the packet from the ingress port to the acquired floating buffer via the identified ingress multiplexer,
identifying an egress multiplexer of the egress multiplexers based on the egress port, and
writing the packet from the acquired floating buffer to the egress port via the identified egress multiplexer.

9. The apparatus of claim 8, wherein the operations comprise:
inserting the buffer identifier into a queue of the egress port; and
causing the egress port to send a ready notification based on a determination that the egress port is ready to handle the packet, wherein the ready notification comprises the buffer identifier, and
wherein identifying the egress multiplexer is triggered by a receipt of the ready notification.

10. The apparatus of claim 8, wherein acquiring the floating buffer comprises retrieving the buffer identifier from an available floating buffer queue.

11. The apparatus of claim 10, wherein the operations comprise releasing the acquired floating buffer based on a completion of writing the packet from the acquired floating buffer to the egress port via the identified egress multiplexer, and wherein releasing the acquired floating buffer comprises inserting the buffer identifier into the available floating buffer queue.

12. The apparatus of claim 8, wherein writing the packet from the ingress port to the acquired floating buffer comprises writing a first portion of the packet to the acquired floating buffer, and wherein writing the packet from the acquired floating buffer to the egress port comprises reading a second portion of the packet concurrently with writing the first portion of the packet.

13. The apparatus of claim 8, comprising:
an integrated circuit chip, wherein the integrated circuit chip comprises the ingress ports, the ingress multiplexers, the egress multiplexers, the floating buffers, and the controller.

14. The apparatus of claim 13, wherein the ingress ports comprise first ingress ports and second ingress ports,
wherein the egress ports comprise first egress ports and second egress ports,
wherein the ingress multiplexers comprise first ingress multiplexers and second ingress multiplexers,
wherein the egress multiplexers comprise first egress multiplexers and second egress multiplexers,
wherein the first ingress ports, the first egress ports, the first ingress multiplexers, and the first egress multiplexers are associated with an internal network, the internal network being internal to the integrated circuit chip, and
wherein the second ingress ports, the second egress ports, the second ingress multiplexers, and the second egress multiplexers are associated with an external network, the external network being external to the integrated circuit chip.

15. The apparatus of claim 14, wherein the operations comprise:
routing a packet between the external network and the internal network.

16. An apparatus comprising:
ingress ports to receive packets;
egress ports to transmit the packets;
ingress switch fabric coupled with the ingress ports;
egress switch fabric coupled with the egress ports;
floating buffers coupled between the ingress switch fabric and the egress switch fabric; and
a controller configured to:
receive a packet via an ingress port of the ingress ports,
determine an egress port of the egress ports based on a destination address of the packet,
acquire a floating buffer of the floating buffers to produce an acquired floating buffer,
send to the egress port a buffer identifier corresponding to the acquired floating buffer,
operate the ingress switch fabric to establish a first pathway between the acquired floating buffer and the ingress port,
write the packet from the ingress port to the acquired floating buffer via the first pathway,
operate the egress switch fabric to establish a second pathway between the acquired floating buffer and the egress port, and
write the packet from the acquired floating buffer to the egress port via the second pathway.

17. The apparatus of claim 16, wherein the controller is configured to insert the buffer identifier into a queue of the egress port, and cause the egress port to send a ready notification based on a determination that the egress port is ready to handle the packet, wherein the ready notification comprises the buffer identifier.

18. The apparatus of claim 16, wherein the controller is configured to acquire the floating buffer by retrieving the buffer identifier from an available floating buffer queue.

19. The apparatus of claim 18, wherein the controller is configured to release the acquired floating buffer by inserting the buffer identifier into the available floating buffer queue in response to completion of writing the packet from the acquired floating buffer to the egress port via the second pathway.

20. The apparatus of claim 16, comprising:
a dual-port memory structure to store the floating buffers,
wherein the controller is configured to use the dual-port memory to overlap writing of at least a first portion of the packet to the acquired floating buffer and reading of at least a second portion of the packet from the acquired floating buffer.

* * * * *